United States Patent Office 3,372,202
Patented Mar. 5, 1968

3,372,202
PREPARATION OF ar-HALOPHENETHYL ALCOHOLS
Chester E. Pawloski, Bay City, Mich., assignor to The Dow Chemical Company, Midland, Mich., a corporation of Delaware
No Drawing. Filed Mar. 5, 1964, Ser. No. 349,763
8 Claims. (Cl. 260—618)

This invention relates to a new chemical process. It relates particularly to a halogenation process whereby there are obtained purer products and improved yields of ar-halophenethyl alcohols and their borate esters. The halogenated alcohols have the formula

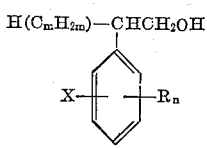

where X is a middle halogen, i.e., bromine or chlorine, R is lower alkyl of 1–4 carbon atoms, $m$ is 0–4 and $n$ is 0.2.

Phenethyl alcohol has been reacted in the past with the elemental halogen to yield ar-monochloro and ar-monobromo derivatives, see Sontag; Ann. de Chim. [11] 1, 359–425 (1934). However, even by running these reactions in the cold, and consequently with very long reaction times, the yields of the desired products were only fair and large quantities of by-products such as the phenethyl halide and the ar-halophenethyl halide were produced, thereby complicating the separation of a pure product. No direct method has been disclosed whereby good yields can be obtained of these ar-monohalophenethyl alcohols which are useful in themselves as insect repellents and are also intermediates which can be dehydrated by conventional means to make the corresponding halogenated styrenes for use as monomers.

It has now been found that a good yield of an ar-halophenethyl alcohol of the above formula is obtained when the borate ester of the corresponding non-halogenated alcohol is contacted in the liquid phase with a halogenating agent and the resulting halogenated borate ester is hydrolyzed to regenerate the alcohol. Although this improved process involves additional steps, the esterification and hydrolysis reactions are easily carried out under moderate conditions and with cheap and easily available reagents. The much reduced proportion of by-products in the final reaction mixture simplifies the separation of the desired halogenated alcohol as a highly purified product.

The triphenethyl borate can be made by any conventional esterification process, for example, by reacting the phenethyl alcohol with boron trichloride, boric anhydride, or boric acid. A convenient and preferred method is the reaction of the alcohol with boric anhydride at moderately elevated temperatures in an inert solvent whereby the water of reaction is distilled, from the mixture substantially as it forms. Best results are obtained at an esterification temperature of about 75–150° C. using at least the theoretical quantity and preferably an excess over that quantity of boric anhydride or boric acid. The triphenethyl borates thereby obtained are viscous liquids of relatively high boiling points and considerable thermal stability.

These esters can be halogenated as such, but are preferably reacted in inert solvent solution because of their viscosity. Any conventional halogenation solvent which is unreactive in the process can be used. Suitable solvents include carbon tetrachloride, ethylene dichloride, methylchloroform, and nitromethane. The borates are easily hydrolyzed and the halogenation mixture should be substantially anhydrous.

While halogenating agents such as sulfuryl chloride or N-bromosuccinimide can be used for the halogenation, elemental chloride or bromine is preferred. A mixture of bromine and chlorine, the so-called bromine chloride, can be used for bromination. For best yields, about one equivalent of halogenating agent is employed per equivalent of the phenethyl borate. Since in most cases there is little or no dihalogenation of the alcohol, a slight excess of halogenating agent usually causes no decrease in yield. About 0.5–1.5 equivalents of halogenating agent is usually employed per equivalent of ester.

The halogenation is operable at any temperature where the borate can be maintained as a stable liquid. Halogenation temperatures of about 0–200° C. are preferred. Halogenation below 0° C. is ordinarily an impractically slow reaction. No catalyst is required for successful halogenation, but a catalyst is preferred in order to obtain a faster rate of reaction, particularly at lower temperatures. Conventional nuclear substitution halogenation catalysts such as iodine, ferric chloide, and stannic chloride are suitable. Any significant quantity of catalyst will have some effect on the rate of halogenation, but ordinarily 0.1–25% by weight based on the borate is employed and 1–10% is preferred.

The tris(ar-halophenethyl)borate can be separated if desired as a pure compound, for example, by distillation of the reaction mixture or by other conventional means. To obtain the alcohol, the reaction mixture can be treated by any conventional ester hydrolysis procedure. Mere stirring with excess aqueous acid or base or, preferably, with excess water alone is sufficient. The liberated halogenated phenethyl alcohol and associated by-products form an organic layer in the hydrolysis reaction mixture. The purified alcohol can be obtained by conventional means such as extraction or, preferably, by distillation of the organic layer.

A preferred mode of operation of this process, therefore, comprises reacting a phenethyl alcohol in inert solvent solution with an excess of boric anhydride at a temperature of 75–150° C. and distilling water of reaction from the solution until the reaction is essentially complete and no more water can be separated. The solution is then reacted at 0–200° C. with elemental halogen after addition of a halogenation catalyst. Reaction times of 0.1–10 hours are appropriate for this step, depending upon the scale of operation. A substantial excess of water over that theoretically required to decompose the borate ester is then stirred with the reaction solution preferably at 30–100° C., until hydrolysis is substantially complete. The organic layer is separated and distilled to obtain the halogenated phenethyl alcohol.

*Example 1*

A reaction flask equipped with a thirty inch distillation column was charged with a mixture of 366 g. of phenethyl alcohol and 70 g. of boron oxide. This mixture was heated under reduced pressure to a final pot temperature of 190° C. and an absolute pressure of 2 mm. Hg until no more water could be distilled from it. The crude phenethyl borate product was transferred to a larger reaction flask equipped with stirrer, condenser, and chlorine sparger. The flask was immersed in a cold water bath, 300 ml. of CCl$_4$ and 5 ml. of SnCl$_4$ were added to the crude borate, and the whole was stirred at 18–32° C. while chlorine was sparged into the reaction solution at about 3 grams per minute. After thirty minutes, another 5 ml. of SnCl$_4$ was added and the chlorine addition was continued for another forty minutes. A total of 213 g. of chlorine was passed into the reaction mixture. The crude product was washed once at room temperature with a liter of water and then was stirred for 90 minutes on a steam bath with 1.5 liters of water. The washed product was separated hot, filtered through a bed of $Na_2CO_3$, and distilled under reduced pressure. There were obtained 141 g. of o-chlorophenethyl alcohol, 55 g. of m-chlorophenethyl alcohol, and 82 g. of p-chlorophenethyl alcohol as well as 26 g. of chlorinated ethylbenzene and 9 g. of higher boiling materials. Some unreacted phenethyl alcohol was also obtained from the distillation and additional unreacted alcohol was present in the wash water. About 67% of the phenethyl alcohol was reacted to yield 89% of the theoretical quantity of ar-chlorophenethyl alcohols.

Example 2 illustrates the results obtained by direct halogenation of phenethyl alcohol itself, the reaction conditions being otherwise as described above.

Example 2

By the same chlorination procedure described in Example 1, 2 g. moles of phenethyl alcohol in 200 ml. of $CCl_4$ was reacted with 2 g. moles of chlorine at 25–30° C. in the presence of $SnCl_4$. Distillation of the washed reaction product yielded 184 g. of ar-chlorophenethyl alcohol, largely the ortho and para isomers, together with 58 g. of higher boiling by-products, mainly ethers. About 77% of the phenethyl alcohol had been reacted to yield 77% of the theoretical ar-chlorophenethyl alcohol. The by-products amounted to 24% by weight of the reacted product after removal of phenethyl alcohol as compared to 11% by weight of by-products obtained in the borate chlorination of Example 1.

Examples 3–7

By the general procedure of Example 1, the borates of phenethyl alcohol and substituted phenethyl alcohols were reacted with halogen and hydrolyzed to obtain the corresponding ar-monohalophenethyl alcohols. Runs 3, 4, 5, and 6 were chlorinations, Run 7 was a bromination. These results are listed in the following table.

| Ex. No. | Alcohol | Catalyst | Percent Conv. | Percent Yield |
|---|---|---|---|---|
| 3 | Phenethyl alcohol | $FeCl_3$ | 62 | 92 |
| 4 | ....do.... | None | 17 | >90 |
| 5 | α-methyl phenethyl alcohol | $FeCl_3$ | 8 | >90 |
| 6 | o-Methylphenethyl alcohol | $SnCl_4$ | 77 | 88 |
| 7 [1] | ar-Dimethylphenethyl alcohol | $FeCl_3$ | 89 | 84 |

[1] The borate was reacted with an equal molar proportion of liquid bromine. An ar-monobromo-ar-dimethylphenethyl alcohol fraction which consisted of mixed isomers was obtained by distillation of the hydrolyzed brominated ester.

Similar halogenations run under the same conditions but using the phenethyl alcohol itself instead of the borate ester produced yields generally in the range of 60–70% of the theoretical amount of ar-monohalo alcohol based on the reacted alcohol. Ethers and polymeric material formed a large proportion of the by-products and the total by-products amounted to 2–4 times the weight of by-products obtained in the corresponding borate halogenations.

By brominating or chlorinating the borates of other lower alkyl phenethyl alcohols by the general procedure of Examples 1 and 36, the corresponding nuclearly monohalogenated alcohols are obtained in similar yields by the hydrolysis of the halogenated esters. Compounds such as 4-chloro-2-ethylphenethyl alcohol, 2-bromo-4-tert-butyl-phenethyl alcohol, 4-chloro-2,6-diisopropylphenethyl alcohol, 4-chloro-α-propylphenethyl alcohol, and ar-bromo-ar-diethylphenethyl alcohol are thereby prepared.

I claim:
1. A process for making an ar-halophenethyl borate which comprises reacting by contacting the borate ester of an alcohol of the formula

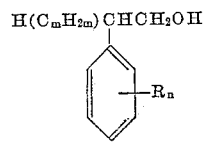

wherein R is lower alkyl, $m$ is 0–4, and $n$ is 0–2, in the liquid phase at 0–200° C. with 0.5–1.5 equivalents of a halogenating agent selected from the group consisting of chlorine, bromine, bromine chloride, sulfuryl chloride, and N-bromosuccinimide.

2. A process for making an ar-halophenethyl alcohol of the formula

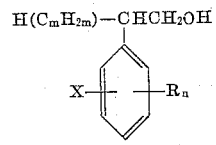

wherein X is a middle halogen, R is lower alkyl, $m$ is 0–4 and $n$ is 0–2, which process comprises reacting by contacting the borate ester of the corresponding non-halogenated phenethyl alcohol in the liquid phase at 0–200° C. with 0.5–1.5 equivalents of a halogenating agent selected from the group consisting of chlorine, bromine, bromine chloride, sulfuryl chloride, and N-bromosuccinimide, hydrolyzing the thereby halogenated borate ester, and separating said ar-monohalophenethyl alcohol from the hydrolyzed product.

3. The process of claim 2 wherein the halogenating agent is an elemental middle halogen.

4. The process of claim 3 wherein the reaction with a middle halogen is carried out in the presence of a nuclear substitution halogenation catalyst.

5. The process of claim 3 wherein the reaction with a middle halogen is carried out in inert solvent solution.

6. A process for making an ar-monohalophenethyl alcohol of the formula

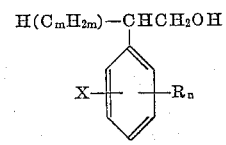

wherein X is a middle halogen, is lower alkyl, $m$ is 0–4, and $n$ is 0–2, which process comprises forming the borate ester of the corresponding non-halogenated phenethyl alcohol by reacting said non-halogenated alcohol with a boron compound selected from the group consisting of boric acid and boric anhydride and removing the water of reaction substantially as it forms, reacting by contacting said borate ester in inert solvent solution with about 0.5–1.5 moles of an elemental middle halogen at about 0° C. to about 200° C. in the presence of a nuclear substitution halogenation catalyst, heating the reacted solution in the presence of an excess of water based on the borate ester, and separating said ar-monohalophenethyl alcohol from the thereby hydrolyzed solution.

7. The process of claim 6 wherein the halogen is chlorine.

8. The process of claim 6 wherein the halogen is bromine.

References Cited

UNITED STATES PATENTS

| | | | |
|---|---|---|---|
| 2,875,236 | 2/1959 | Levens et al. | 260—618 X |
| 2,975,211 | 3/1961 | Girard | 260—618 X |
| 3,189,565 | 6/1965 | Woods et al. | 260—462 X |

OTHER REFERENCES

Kovacia et al., J. Org. Chem., vol. 26, pp. 214–7 (1961).

Steinberg et al., Ind. and Eng. Chem., vol. 49, pp. 174–81 (1957).

LEON ZITVER, Primary Examiner.

T. G. DILLAHUNTY, Assistant Examiner.